United States Patent [19]

Okada et al.

[11] Patent Number: 5,047,188

[45] Date of Patent: Sep. 10, 1991

[54] PROCESS FOR PREPARATION OF MODIFIED METHACRYLIC RESIN MOLDING MATERIAL

[75] Inventors: Kazuya Okada; Masahiro Taniguchi; Yasunori Shimomura; Hidemi Tanaka, all of Toyama; Tsutomu Matsui, Nakashinkawa, all of Japan

[73] Assignee: Mitsubishi Rayon Company, Ltd., Tokyo, Japan

[21] Appl. No.: 369,017

[22] Filed: Jun. 21, 1989

[30] Foreign Application Priority Data

Jun. 25, 1988 [JP] Japan .................. 63-156022

[51] Int. Cl.⁵ .............................. B29B 7/84
[52] U.S. Cl. .......................... 264/101; 264/211.23; 264/211.24; 264/349; 264/331.18; 425/203
[58] Field of Search ................... 264/101, 102, 211.23, 264/211.24, 349, 331.18; 425/203

[56] References Cited

U.S. PATENT DOCUMENTS

| | | | |
|---|---|---|---|
| 3,642,752 | 2/1972 | Sutter | 264/102 |
| 3,751,527 | 8/1973 | Bortnick | 264/102 |
| 3,825,515 | 7/1974 | Lucas et al. | 260/318 M |
| 3,900,453 | 8/1975 | Shimada et al. | 526/68 |
| 3,968,059 | 7/1976 | Shimada et al. | 526/68 |
| 3,968,090 | 7/1976 | Shimada et al. | 526/88 |
| 3,992,500 | 11/1976 | Kruder et al. | 264/102 |
| 4,065,532 | 12/1977 | Wild et al. | 425/203 |
| 4,324,868 | 4/1982 | Maeda | 525/54 |
| 4,649,005 | 3/1987 | Kobayashi et al. | 264/101 |

FOREIGN PATENT DOCUMENTS 1454804 2/1969 Fed. Rep. of Germany.
58-211434 12/1983 Japan .................. 425/203

*Primary Examiner*—Jeffery Thurlow
*Attorney, Agent, or Firm*—Oblon, Spivak, McClelland, Maier & Neustadt

[57] ABSTRACT

Disclosed is a process for the preparation of a modified methacrylic resin molding material, wherein a volatile component is removed from a methacrylic polymer composition containing a volatile component including an unreacted monomer, a solvent or a by-product, and a modifying polymer is added to the methacrylic polymer composition to prepare a modified molding material. The removal of a volatile component from the methacrylic polymer composition and the addition and kneading of a modifying polymer into this polymer composition can be performed at a high efficiency by a process wherein a volatile component-removing extruder comprising a plurality of vent zones and a modifying polymer supply mechanism arranged upstream of the final vent zone but preferably downstream of the adjacent vent zone is used, the modifying polymer is fed from the modifying polymer supply mechanism and incorporated into the methacrylic polymer composition continuously flowing in the volatile component-removing extruder, and the volatile component is removed from the obtained mixture in the final vent zone and the mixture is then extruded.

5 Claims, 2 Drawing Sheets

PROCESS FOR PREPARATION OF MODIFIED METHACRYLIC RESIN MOLDING MATERIAL

BACKGROUND OF THE INVENTION (1) Field of the Invention

The present invention relates to a process for preparing a modified molding material by blending a methacrylic polymer composition with a modifying polymer in an extruder.

(2) Description of the Related Art

A process comprising blending a methacrylic polymer composition with a modifying polymer by a Henschel mixer, a tumbling mixer or the like and extruding the blend is generally known. This process however, has a problem in that, when a modifying polymer is blended into a methacrylic polymer composition containing a large quantity of a volatile component and the blend is extruded, the modifying polymer is deposited on the wall surface of an apparatus or bridging of polymer particles occurs in a hopper, and therefore, it is difficult to stably supply polymers at a constant rate.

Japanese Unexamined Patent Publication No. 50-43166 proposes a vented extruder suitable for incorporating an additive such as an antioxidant or an ultraviolet absorber into a methacrylic resin flowing through the vented extruder. In this extruder, an additive-inlet is provided in a barrel between a final vent hole and an extrusion die.

SUMMARY OF THE INVENTION

The primary object of the present invention is to provide a process in which removal of a volatile component from a volatile component-containing methacrylic polymer composition and addition and kneading of a modifying polymer into this polymer composition can be performed at a high efficiency and industrially advantageously, and a high-quality methacrylic resin molding material having a reduced degree of coloration can be obtained without problems such as a deposition of the modifying polymer on the inner wall surface of an apparatus.

In accordance with the present invention, there is provided a process for the preparation of a modified methacrylic resin molding material, which comprises removing a volatile component from a methacrylic polymer composition containing a volatile component comprising an unreacted monomer, a solvent or a by-product, and adding a modifying polymer to the methacrylic polymer composition to prepare a modified molding material, wherein a volatile component-removing extruder comprising a plurality of vent zones and a modifying polymer supply mechanism arranged upstream of the final vent zone is used, the modifying polymer is fed from the modifying polymer supply mechanism and incorporated into the methacrylic polymer composition continuously flowing in the volatile component-removing extruder, and the volatile component is removed from the obtained mixture in the final vent zone and the mixture is then extruded.

DESCRIPTION OF THE PREFERRED EMBODIMENTS

Figure 1:
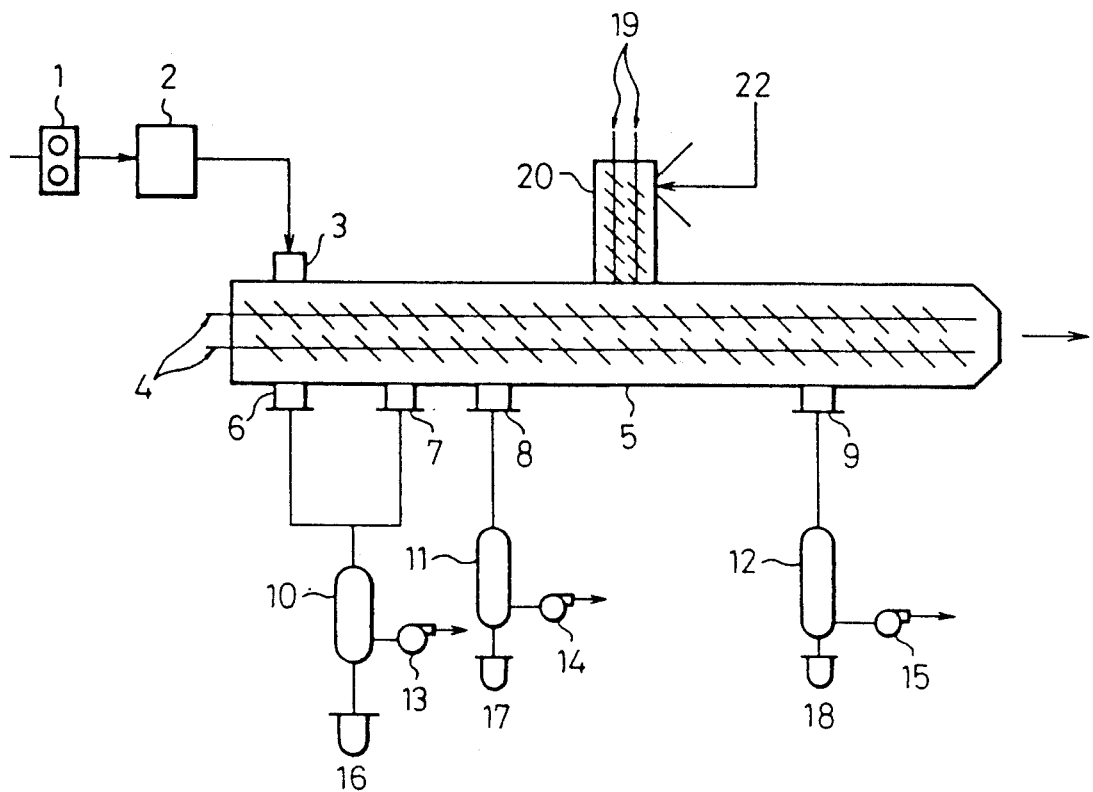
FIG. 1 is a schematic conceptual diagram illustrating an example of a volatile component-removing kneading extruder preferably used in the process of the present invention.

Preferably, at the step of incorporating the modifying polymer, the content of the volatile component in the methacrylic polymer composition flowing in the volatile component-removing extruder is controlled below 5% by weight.

The methacrylic polymer composition containing a volatile component composed of an unreacted monomer, a solvent and/or a by-product, which is supplied in the present invention, is a composition comprising a homopolymer of an alkyl methacrylate, especially methyl methacrylate, or a copolymer of at least two alkyl methacrylates or a copolymer of an alkyl methacrylate with a vinyl compound such as an alkyl acrylate, styrene, butadiene or acrylonitrile and containing, in general 15 to 60% by weight of a volatile component as mentioned above. This composition is prepared by removing a part of a volatile component from a bulk polymerization product or solution polymerization product.

As typical examples of the modifying polymer to be added to the above-mentioned methacrylic resin composition, there can be mentioned an impact-resistant modifying polymer and a thermal deformation-resistant modifying polymer, although the modifying polymer is not limited, to these polymers.

As the impact-resistant modifying polymer, there can be mentioned a polymer obtained by graft-polymerizing a vinyl monomer to an acrylic rubber and a polymer obtained by graft-polymerizing a vinyl monomer to a homopolymer or copolymer of butadiene as a rubber source. A specific example of the acrylic rubber is a homopolymer or copolymer of an acrylic acid ester having a glass transition temperature not higher than 0° C. For example, a multi-stage polymer obtained by graft-polymerizing at least one vinyl monomer to this acrylic rubber as a rubber source so that the glass transition temperature of the grafted portion is not lower than 50° C., can be mentioned.

Preferably, the amount of the impact-resistant modifying polymer incorporated is 5 to 80% by weight based on the methacrylic polymer. If the amount of the impact-resistant modifying polymer is smaller than 5% by weight, in general, manifestation of the impact resistance is poor. If the amount of the impact-resistant modifying polymer incorporated exceeds 80% by weight, the thermal deformation resistance and rigidity are often reduced. More preferably the impact-resistant modifying polymer is incorporated in an amount of 10 to 60% by weight.

As the thermal deformation-resistant modifying polymer, there can be mentioned a quadripolymer comprising methyl methacrylate as a main component and styrene, α-methylstyrene and maleic anhydride as comonomers, a terpolymer comprising methyl methacrylate as a main component and α-methylstyrene cyclohexylmaleimide as comonomers, a methyl methacrylate/cyclohexylmaleimide copolymer and a methyl methacrylate/N-phenylmaleimide copolymer.

Preferably, the amount of the thermal deformation-resistant modifying polymer incorporated is 10 to 85% by weight based on the methacrylic polymer. If the amount of the thermal deformation-resistant modifying polymer incorporated is smaller than 10% by weight, the thermal deformation resistance is improved only to a minor extent, and if the amount of the thermal deformation-resistant modifying polymer incorporated exceeds 85% by weight, the coloration and brittleness are increased. More preferably the thermal deformation-resistant modifying polymer is incorporated in an amount of 20 to 80% by weight.

An additive such as an ultraviolet absorber, a release agent, a coloring dye or a pigment can be incorporated into the methacrylic resin composition to be modified by the process of the present invention, if necessary.

The process of the present invention will now be described in detail with reference to the accompanying drawings.

FIG. 1 is a schematic conceptual diagram illustrating an example of a volatile component-removing kneading extruder suitably used in carrying out the process of the present invention. Referring to FIG. 1, a methacrylic polymer composition containing a volatile component composed of an unreacted monomer, a solvent and/or a by-product is fed at a constant rate to a heater 2 by a metering pump 1 and is heated at 110° to 250° C. under a pressure of 10 to 100 kg/cm². The heated methacrylic polymer composition is passed through a flash nozzle 3 having a needle valve or an orifice or fine-width slit and supplied into a first vent zone defined by a screw 4 and a barrel of a volatile component kneading extruder 5, where the volatile component is separated.

Figure 2:
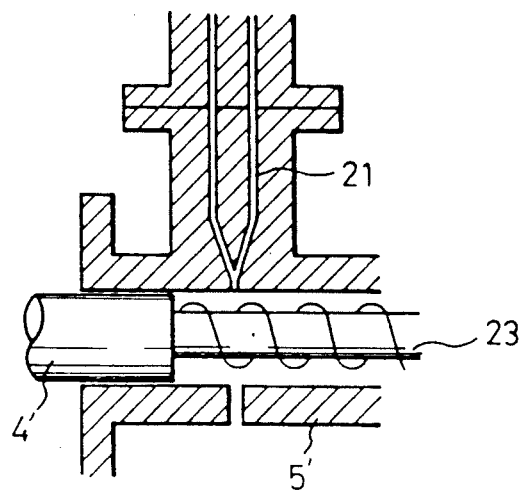
FIG. 2 is a sectional view illustrating a nozzle for supplying a methacrylic polymer composition.

FIG. 2 is a sectional view showing a nozzle for supplying a methacrylic polymer composition, which has a needle valve 21. The polymer composition is passed through a narrow cylindrical space around the needle valve 21 and is extruded into a first vent zone defined by a barrel of an extruder 5' and a screw 23 (a twin-screw extruder 5 having a screw 4 is shown in FIG. 1 but a single-screw extruder 5' having a single screw 4, is shown in FIG. 2).

The first vent zone is maintained at a temperature of about 100° to about 250° C. and a pressure of about 500 to about 800 Torr, and the majority of the volatile component composed of an unreacted monomer, a solvent and/or a by-product is removed in the first vent zone and is discharged through a vent hole of a discharge pipe 6. The discharged volatile component is substantially condensed in a condenser 10 and recovered in a receiver 16 while the uncondensed portion is sucked by a vacuum pump 13.

To further reduce the amount of the volatile component in the methacrylic polymer composition, the methacrylic polymer composition is fed into a second vent zone and a third vent zone where the majority of the residual volatile component is removed under conditions of a temperature of about 220° to about 280° C. and a pressure lower than 700 Torr. The removed volatile component is introduced into discharge systems through vent hole-provided discharge pipes 7 and 8 of the second vent zone and third vent zone, respectively. The discharge systems have condensers 10 and 11, receivers 16 and 17, and pumps 13 and 14, respectively.

The modifying polymer is fed to a polymer-supplying twin-screw feeder comprising a screw 19 and a barrel 20 from a supply opening 22, and then the modifying polymer is forcibly pushed at a constant rate into the twin-screw extruder 5 through which the methacrylic polymer composition travels, whereby the modifying polymer is integrally kneaded with the methacrylic polymer composition. In a fourth vent zone, the residual volatile component is removed from the kneaded mixture. The removed volatile component is introduced through a discharge pipe a into a discharge system comprising a condenser 12, a receiver 18 and a pump 15. The kneaded mixture which has passed through the fourth vent zone is extruded from an extrusion nozzle (not shown).

The number of the vent zones in the volatile component-removing extruder is not limited to the number in the above-mentioned embodiment, but can be increased or decreased as occasion demands. The number of the vent zones is preferably 2 to 6. Nevertheless, the supply mechanism for the modifying polymer must be disposed upstream of the final vent zone of the volatile component-removing extruder, but is preferably disposed down-stream of the vent zone adjacent to the final vent zone, i.e., at a position intermediate between the final vent zone and the vent zone located upstream of the final vent zone and closest to the final vent zone.

Where the supply mechanism for the modifying polymer is disposed at this position, removal of the volatile component from the methacrylic polymer composition and kneading of the methacrylic polymer composition with the modifying polymer can be efficiently accomplished, and a high-quality methacrylic resin molding material having a reduced degree of coloration can be obtained without problems such as the deposition of the modifying polymer on the inner wall surface of the apparatus, reduction of the thermal deformation temperature, and the formation of silver streaks in molded articles formed during injection molding.

Preferably, at the step of mixing the modifying polymer into the methacrylic polymer composition, the content of the volatile component in the methacrylic polymer composition is controlled below 5% by weight.

The process of the present invention will now be described in detail with reference to the following examples.

EXAMPLE 1

Removal of a volatile component from a methacrylic polymer and modification thereof were carried out by using the volatile component-removing extruder shown in FIG. 1.

A polymer mixture comprising 60% by weight of a methyl methacrylate/methyl acrylate copolymer (the content of methyl acrylate was 4% by weight), 20% by weight of toluene and 20% by weight of unreacted monomers and impurities, which was prepared by the solution polymerization process, was heated at 180° C. under an elevated pressure of 15 kg/cm² by using a heater and a metering pump, and the mixture was fed at a rate of 500 kg/hr to the volatile component-removing extruder through a flash nozzle having an orifice having an inner diameter of 7.0 mm and a length of 20 mm. In the volatile component-removing extruder, the first vent zone was maintained at a temperature of 220° C. and a pressure of 650 Torr, the second vent zone was maintained at a temperature of 240° C. and a pressure of 600 Torr, and the third vent zone was maintained at a temperature of 250° C. and a pressure of 30 Torr, whereby the residual volatile component was removed. Then a polymer obtained by graft-polymerizing a monomer mixture comprising methyl methacrylate as a main component to a butyl acrylate copolymer as a rubber source (Acrypet IR supplied by Mitsubishi Rayon) was fed at a rate of 150 kg/hr from the side of the extruder by using a screw feeder and mixed with the polymer mixture in the extruder. In the fourth vent zone, the residual volatile component was removed again under conditions of a temperature of 270° C. and a pressure of 30 Torr. The blend was extruded from the nozzle, cooled to 55° C., and cut to a length of 3 mm to form a pellet.

The residual monomer content in the obtained pellet was lower than 0.2% by weight. The Izod impact strength (ASTM D-256) of the obtained pellet was as high as 3.0 kg.cm/cm, and this value was not substantially different from that of a commercially available preblend product. The coloration degree of the obtained resin composition was very good, and the YI value (JIS K-7105) of a plate (2 mm×110 mm×110 mm) molded at 250° C. was 0.5. Deposition of the modifying polymer onto the inner wall surface of the apparatus was not observed.

EXAMPLE 2

Removal of a volatile component from a methacrylic polymer and modification thereof were carried out by using the volatile component-removing extruder shown in FIG. 1. In this example, methyl methacrylate, from which dissolved oxygen had been removed according to a process shown in FIG. 3, was used for the preparation of the starting methacrylic polymer.

A polymer composition prepared by the bulk polymerization process using the dissolved oxygen-removed methyl methacrylate, which comprised 60 parts by weight of a methyl methacrylate polymer, 40 parts by weight of a methyl methacrylate monomer, 0.3 part by weight of n-octylmercaptan, and 0.4 part by weight of impurities, was heated at 240° C. while elevating the pressure to 38 kg/cm$^2$, and the polymer composition was fed at a rate of 150 kg/hr to the volatile component-removing extruder through a pipe having an inner diameter of 5 mm. The first vent zone was maintained at 230° C. and 700 Torr, the second vent zone was maintained at 240° C. and 500 Torr, and the third vent zone was maintained at 240° C. and 50 Torr. A polymer obtained by graft-polymerizing a monomer mixture comprising methyl methacrylate as a main component to a butyl acrylate copolymer as a rubber component (Acrypet IR supplied by Mitsubishi Rayon) was supplied at a rate of 360 kg/hr from the modifying polymer supply mechanism and blended into the polymer composition in the extruder. The residual volatile component was removed in the fourth vent zone maintained at 270° C. and 30 Torr, and the blend was extruded to form a pellet.

The residual monomer content in the obtained pellet was lower than 0.1% by weight. The Izod impact strength (ASTM D-256) of the obtained pellet was as high as 7.0 kg.cm/cm. The YI value (JIS K-7105) of a plane plate obtained by injection molding at 250° C. was as good as 0.9.

Figure 3:
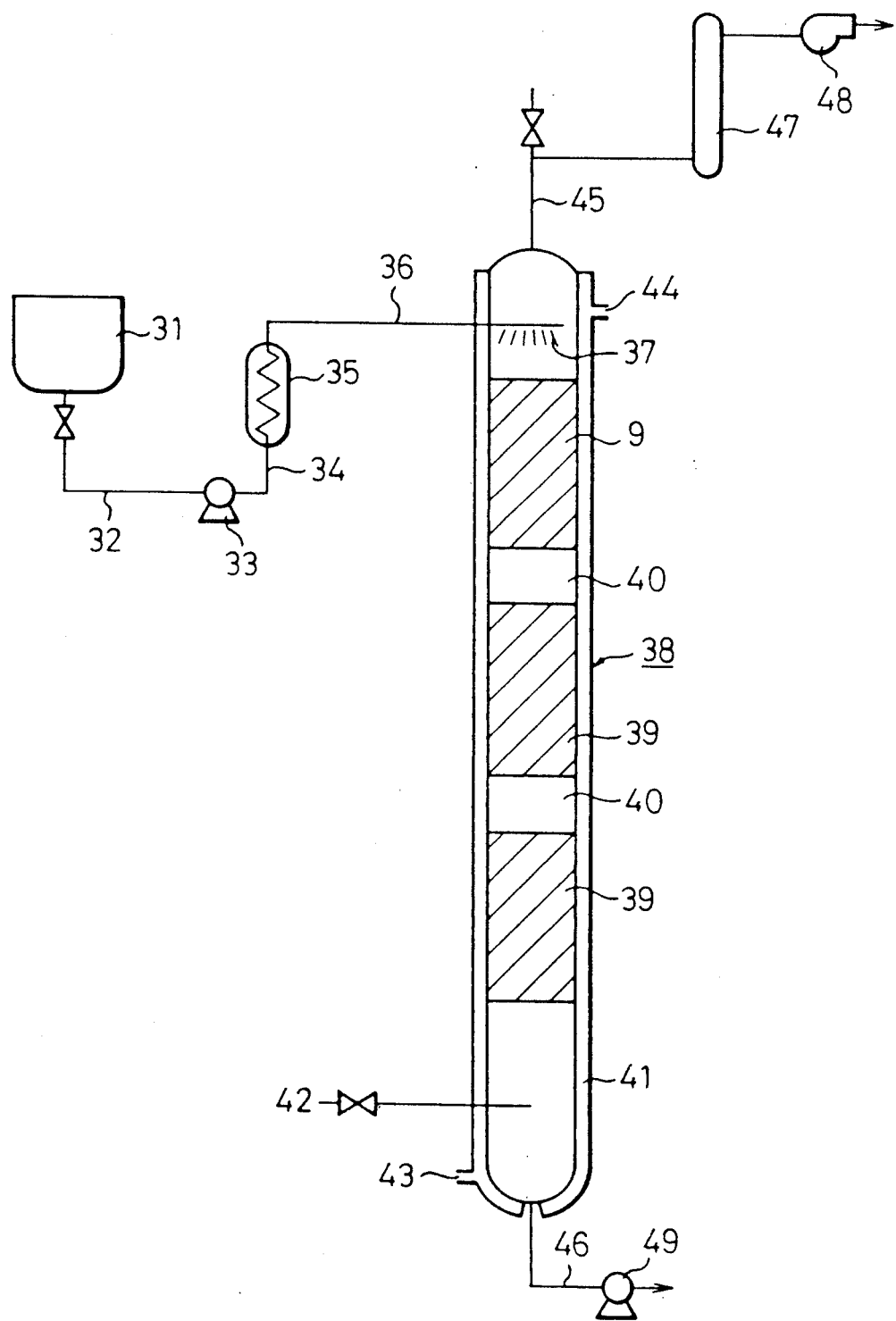
FIG. 3 is a sectional view showing the dissolved oxygen-removing column used in Example 3.

The process for continuously removing dissolved oxygen, which was adopted for preparing the starting methyl methacrylate used in this example, will now be described with reference to FIG. 3.

A methyl methacrylate monomer containing dissolved oxygen is passed through a supply line 32 from a reservoir 31 and fed into a cooler 35 through a line 34 by a pump 33. The temperature of the methyl methacrylate monomer is controlled to a predetermined level in the cooler 35, and the methyl methacrylate monomer is passed through a line 36 and caused to flow down in a packed column 38 from distributing pipes 37 arranged in the upper portion of the column 38. The packed column 38 is provided with a jacket 41, and a cooling medium is introduced into the jacket 41 from an inlet 43, circulated in the jacket 41 and discharged from a discharge opening 44. A packed layer 39 divided into a plurality of portions, space portions 40 and an inert gas supply pipe 42 are arranged in the packed column 38. Dissolved oxygen contained in the methyl methacrylate monomer and the supplied inert gas are discharged to the outside through an exhaust pipe 45 arranged at the top of the packed column 38. A condenser 47 and a vacuum pump 48 are attached to the exhaust pipe 45. The methyl methacrylate monomer, from which dissolved oxygen has been removed, is continuously discharged from the bottom of the packed column 38 through a line 46 by a pump 49.

EXAMPLE 3

Removal of a volatile component from a methacrylic polymer and modification thereof were carried out by using the volatile component-removing extruder shown in FIG. 1.

More specifically, a polymer composition prepared by the bulk polymerization process, which comprised 60 parts by weight of a methyl methacrylate/methyl acrylate copolymer (the methyl acrylate content was 0.5% by weight), 40 parts by weight of a methyl methacrylate/methyl acrylate mixed monomer, 0.3 part by weight of n-octylmercaptan, and 0.4 part by weight of impurities, was heated at 180° C. while elevating the pressure to 15 kg/cm$^2$, and the polymer composition was fed at a rate of 333 kg/hr to the volatile component-removing extruder through five orifices having an inner diameter of 7 mm. The first vent zone was maintained at 220° C. and 550 Torr, the second vent zone was maintained at 245° C. and 500 Torr, and the third vent zone was maintained at 240° C. and 50 Torr. A heat-resistant methyl methacrylate/α-methylstyrene/styrene/maleic anhydride copolymer (Acrypet ST supplied by Mitsubishi Rayon) was fed at a rate of 200 kg/hr from the modifying polymer supply mechanism and blended into the polymer composition in the extruder. In the fourth vent zone, the residual volatile component was removed under conditions of a temperature of 270° C. and a pressure of 20 Torr, and the blend was extruded to form a pellet.

The residual monomer content in the obtained pellet was lower than 0.2% by weight, the heat distortion temperature (ASTM D-648) of the pellet was 112° C., and the YI value (JIS K-7105) of a plane plate molded at 250° C. was 0.9.

COMPARATIVE EXAMPLE 1

A modified methacrylic resin molding material was prepared in the same manner as described in Example 1 except that the fourth vent zone was omitted from the apparatus used in Example 1.

The residual monomer content in the obtained pellet was 0.7% by weight, and the Izod impact strength (ASTM D-256) of the pellet was 2.8 kg.cm/cm. However, the YI value (JIS K-7105) of a plane plate (2 mm×110 mm×110 mm) molded at 250° C. was 2.5 and the plate had a yellow color, and defects such as silver streaks were found in the molded plate. The heat distortion temperature (ASTM D-648) of the molded article was as low as 85° C.

We claim:

1. A process for the preparation of a modified methacrylic resin molding material in which volatile components are removed from a methacrylic polymer composition and the methacrylic polymer composition is mixed with a modifying polymer, which comprises:

extruding said methacrylic polymer composition through a volatile component-removing extruder equipped with a plurality of vent zones from a first vent zone to a final vent zone, whereby the volatile components of unreacted monomer, solvent and by-product are vented from the extruder, and equipped with a screw type feeder modifying polymer supply means arranged between the final vent zone and the vent zone adjacent the final vent zone; and feeding modifying polymer into said extruder by means of said screw-type feeder and mixing said modifying polymer with said methacrylic polymer as the material continuously flows through said extruder, the venting of volatile components occurring through all vent zones and occurring as a mixture of polymer material is continuously extruded and said modifying polymer being at least one member selected from the group consisting of (i) a multi-stage polymer obtained by graft-polymerizing a vinyl monomer to an acrylic rubber, (ii) a polymer obtained by graft-polymerizing a vinyl monomer to a homopolymer or copolymer of butadiene as a rubber source, (iii) a quadripolymer comprising methyl methacrylate as the main component and styrene, $\alpha$-methylstyrene and maleic anhydride as comonmer components, (iv) a terpolymer comprising methyl methacrylate as the main component and $\alpha$-methylstyrene and cyclohexylmaleimide as comonomer components, (v) a methyl methacrylate/cyclohexylmaleimide copolymer, and (vi) a methyl methacrylate/N-phenylmaleimide copolymer.

2. A process for the preparation of a modified methacrylic resin molding material according to claim 1, wherein the number of the vent zones is 2 to 6.

3. The process for the preparation of a modified methacrylic resin molding material according to claim 1, wherein the volatile component content of the methacrylic polymer composition in the extruder is controlled to a level below 5% by weight at the point where said modifying polymer is fed into said extruder through said screw-type feeder.

4. The process for the preparation of a modified methacrylic resin molding material according to claim 1, wherein the temperature of the first of said vent zones is within the range of 100° to about 250° C. and is at a pressure of about 500 to about 800 torr.

5. The process for the preparation of a modified methacrylic resin molding material according to claim 1, wherein the temperature of a second and a third of said vent zones ranges from about 220° to about 280° C. at a pressure lower than 700 torr.

* * * * *